United States Patent [19]

Whitfield

[11] 4,318,076
[45] Mar. 2, 1982

[54] DYNAMIC CLIMATIC CONDITION INDICATING SYSTEM

[75] Inventor: John H. Whitfield, Hanceville, Ala.

[73] Assignee: Dais Corporation, Warrior, Ala.

[21] Appl. No.: 175,560

[22] Filed: Aug. 5, 1980

[51] Int. Cl.³ .................... G01C 21/00; H04Q 9/00
[52] U.S. Cl. .................... 340/27 NA; 73/178 T; 340/870.07
[58] Field of Search .................... 364/427–430, 364/435; 73/178 R, 178 T; 340/870.07, 870.09, 27 NA

[56] References Cited

U.S. PATENT DOCUMENTS 4,137,764  2/1979  Hallock et al. .................... 73/178 T
4,163,216  7/1979  Arpino .................... 340/870.07

*Primary Examiner*—Thomas A. Robinson

*Attorney, Agent, or Firm*—Beveridge, De Grandi, Kline & Lunsford

[57] ABSTRACT

A system for providing within the cockpit of an aircraft to the operator thereof a dynamic indication of climatic conditions at an airport. Such climatic conditions might include wind direction, wind speed, visibility, barometric pressure, temperature, and cloud height, among others. A transmitting station within the airport includes one or more climatic condition sensors such as a wind vane, an anemometer, a barometer, etc., an encoder for providing an encoded signal indicative of the sensed climatic conditions, and a radio transmitter for transmitting the encoded signal. A receiving station within the aircraft includes a radio receiver for receiving the transmitted encoded signal, a decoder for decoding the encoded signal to provide the dynamic climatic condition data, and a display for displaying that data.

8 Claims, 5 Drawing Figures

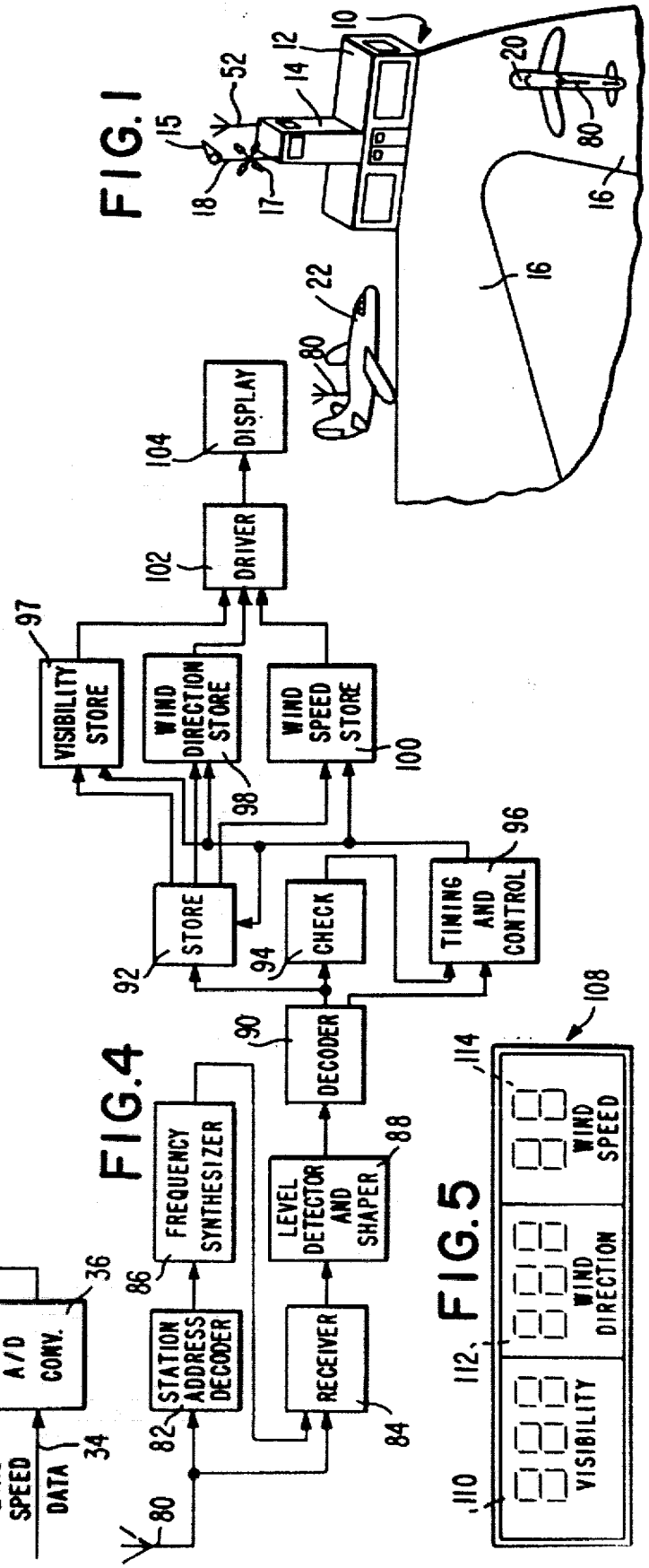

DYNAMIC CLIMATIC CONDITION INDICATING SYSTEM

BACKGROUND OF THE INVENTION

The present invention pertains to a climatic condition indicator. More particularly, the present invention pertains to a system for providing to the pilot of an aircraft a dynamic indication of climatic conditions at an airport, such conditions including for example wind speed, wind direction, barometric pressure, temperature, cloud height, and visibility.

Information as to climatic conditions at an airport is essential to pilots to airplanes attempting to take off or land at the airport. While heavily used airports serving large metropolitan areas frequently have sophisticated equipment to assist pilots of aircraft in taking off or landing at those airports, numerous smaller airports in less populous areas are in operation without such sophisticated equipment. These smaller airports handle in total considerable quantities of air traffic.

Larger aircraft are likely to contain sophisticated equipment to assist their pilots, but small aircraft frequently are not so equipped. These smaller aircraft are very susceptible to sudden changes in climatic conditions under certain circumstances. By way of example, sudden changes in wind speed or direction can greatly affect an airplane during taken off or landing.

Climatic data, such as wind data, of a static nature are of some use to pilots during taken off and landing of aircraft; however, such data are actually of only limited value, particularly during periods of rapidly changing climatic conditions. By way of example, if the wind is gusting strongly and is constantly changing direction, the take off and landing of an aircraft, particularly a lighter aircraft, can be extremely hazardous. Numerous smaller aircraft, particularly when operating at comparatively small airports in areas of lesser population density, are provided only with static information as to climatic conditions, for example indications of a fixed wind direction and speed. This static information might be updated only at infrequent intervals, for example hourly, with the assumption being required that the climatic conditions do not change between updating. Such information is of little benefit when the climatic conditions are changing rapidly, for example when the wind is gusting strongly and is frequently changing direction.

If the pilot of an aircraft can be provided with dynamic information as to climatic conditions, particularly during times when the climatic conditions are changing rapidly, the likelihood of disastrous consequences from such changes is considerably reduced.

SUMMARY OF THE INVENTION

The present invention is a system for providing within the cockpit of an aircraft to the operator of the aircraft a dynamic indication of climatic conditions at an airport, thereby assisting the aircraft operator in the safe take off or landing of the aircraft. In accordance with the present invention, the airport is provided with a transmitting station which includes a climatic condition sensor for generating dynamic climatic condition data indicative of climatic conditions at the airport, an encoder for encoding the dynamic climatic condition data to provide an encoded signal indicative of that data, and a radio transmitter for transmitting the encoded signal on a selected radio frequency. Aircraft operating at the airport are provided with a radio receiver for receiving the encoded signal as transmitted on the selected radio frequency by the radio transmitter at the airport, a decoder for decoding the encoded signal as received by the radio receiver to provide the dynamic climatic condition data, and a dynamic display for displaying to the operator of the aircraft a dynamic indication of climatic conditions at the airport. In one preferred embodiment of the present invention, the climatic condition sensor senses wind conditions, and the dynamic wind data are transformed into a digital signal which is then combined with a station address signal, indicative of the identification of the airport, and a check signal such as a cyclic redundancy check. The resulting digital word is encoded in a suitable manner and applied to a radio transmitter. Within the aircraft, a radio receiver applies the signal to a station address decoder which selects from available signals the signals from the transmitter at the selected airport. The desired received signal is then decoded and checked for errors, and the wind data are obtained therefrom and applied to the indicator, such as a seven segment display, to provide the operator of the aircraft with a dynamic indication of climatic conditions at the airport. Thus, the climatic condition information supplied to the indicator within the aircraft might include wind direction information and wind speed information, or any other information desired to as climatic conditions.

BRIEF DESCRIPTION OF THE DRAWINGS

These and other aspects and advantages of the present invention are more apparent from the following detailed description and claims, particularly when considered in conjunction with the accompanying drawings. In the drawings:

FIG. 1 is an illustration of aircraft at an airport utilizing a system in accordance with the present invention to provide to the operators of the aircraft a dynamic indication of climatic conditions at the airport;

FIG. 2 is a block diagram of a transmitting station suitable for operation at an airport in accordance with the present invention;

FIG. 3 illustrates a data word such as might be transmitted in a system in accordance with the present invention;

FIG. 4 is a block diagram of a receiving station suitable for operation within an aircraft in accordance with the present invention; and FIG. 5 illustrates a display of climatic condition data as might be provided to the operator of an aircraft in accordance with the present invention.

DETAILED DESCRIPTION OF A PREFERRED EMBODIMENT

FIG. 1 depicts an airport 10 having a terminal building 12 including a control tower 14 and one or more runways 16. Control tower 14 is provided with a climatic condition sensor 18 which, by way of example, might include a wind vane 15 for sensing wind direction and an anomometer 17 for sensing wind speed. Illustratively, FIG. 1 depicts a first airplane 20 positioned on one of the runways 16 at airport 10 and a second airplane 22 preparing for landing at the airport. Climatic condition sensor 18 might additionally include any of several types of sensors capable of sensing different climatic conditions such as temperature and barometric pressure. In addition, manual controls (not shown)

might be provided for supplying signals indicative of such climatic conditions as visibility or cloud height. Further, nonchanging data of interest to pilots, such as the altitude of airport 10, can be provided through hard wired inputs.

Climatic condition information obtained from sensor 18 is applied to electronic processing and transmitting equipment within terminal building 12 and/or control tower 14. FIG. 2 illustrates a transmitting station suitable for operation at airport 10 to provide to aircraft, such as airplanes 20 and 22, dynamic data about climatic conditions at airport 10 as sensed by sensor 18. Visibility data are applied by input line 26 to analog-to-digital converter 28, the output of which is thus a digital signal representative of the visibility at airport 10. Similarly, wind direction data from wind vane 15 are applied by input line 30 to analog-to-digital converter 32, and wind speed data as sensed by anemometer 17 are applied by input line 34 to analog-to-digital converter 36. If any of the input data are already in digital form, the corresponding analog-to-digital converter can be replaced by a storage circuit. Analog-to-digital converters 28, 32, and 36 have their outputs applied to gate circuit 38, the output of which is connected to parallel-to-serial converter 42. Station address generator 44 generates a digital signal indicative of the identification of the particular airport 10 at which the transmitting station of FIG. 2 is located. This station address signal is applied by generator 44 to parallel-to-serial converter 42. Timing and control unit 40 applies appropriate control signals to analog-to-digital converters 28, 32, and 36 to cause the data within these components to be updated at frequent periodic intervals. Likewise, timing and control circuit 40 causes gate circuit 38 and station address generator 44 to apply to parallel-to-serial converter 42 the visibility, wind direction and wind speed data from analog-to-digital converters 28, 32 and 36 and the station address signal from generator 44.

Timing and control unit 40 assures that the station address signal, the visibility data, the wind direction data, and the wind speed data are properly sequenced into a digital signal which is then applied by parallel-to-serial converter 42 to check generator 46. Generator 46 adds an appropriate check component to the digital signal, by way of example, a cyclic redundancy check or a parity check. The resulting digital signal is then applied to encoder 48 which encodes the signal in a suitable manner to form a digitally encoded word. Encoder 48, by way of example, might convert the digital signal to a digital word encoded in Manchester code or other appropriate code. The encoded digital word from encoder 48 is applied to transmitter 50 to modulate the signal which is applied by the transmitter to antenna 52 which, as illustrated in FIG. 1, might be mounted on top of control tower 14 at airport 10. Transmitter 50 preferably is a F.M. transmitter of low power, for example about 0.5 Watt.

FIG. 3 illustrates the digital word 58 as transmitted by the transmitting station of FIG. 2. Illustratively, digital word 58 might be a binary encoded word made up of 100 bits. The first portion 60 of word 58 comprises a preamble of, for example, about 48 bits. The next portion 62 of word 58 contains the station address signal and, by way of example, might comprise eight bits. The next portion 63 of word 58 contains the visibility data and might include ten bits. The following portion 64 of the digital word can contain wind direction data and might include about ten bits. The next portion 66 of word 58 contains wind speed data and might include about eight bits. The final portion 68 of the digital word contains the cyclic redundancy check or other check information and can include sixteen bits. FIG. 3, of course, is only illustrative of the data word, and other formats might be utilized.

As illustrated in FIG. 1, each aircraft 20 and 22 is equipped with a receiving antenna 80 adapted to receive the radio signal as transmitted by transmitting antenna 52. As seen in FIG. 4, the received signal is applied by antenna 80 to station address decoder 82 and to receiver 84. Decoder 82 is controlled by a control within the aircraft to be responsive to the station address code indicative of a desired airport 10 so as to cause the receiver within that aircraft to respond to signals transmitted from the desired airport 10. The decoded station address signal is applied to frequency synthesizer 86, the output of which enables receiver 84 to pass the received data word from the desired airport 10. The output of receiver 84 is applied to level detector and shaper 88 which detects the received pulse levels of the digital signal and restores the pulse shape. The regenerated digital signal is then applied to decoder 90 which decodes the Manchester encoded or other data and applies the resulting signal to storage unit 92. In addition, the check portion of the received data word, such as the cyclic redundancy check or parity check, is applied to check circuit 94 which assures that an error-free signal has been received. Decoder 90 also applies a synchronizing pulse to timing and control unit 96. Should check unit 94 determine that an error is present in the received signal, it applies an error signal to timing and control unit 96, causing the timing and control unit 60 inhibit display of the erroneous data.

The visibility data are applied from storage circuit 92 to visibility storage unit 97, while the wind direction data are applied to wind direction storage unit 98, and the wind speed data are applied to wind speed storage unit 100. The visibility data, the wind direction data, and the wind speed data are then applied at intervals determined by timing and control unit 96 to driver 102, the output of which is applied to display unit 104 which, by way of example, might be a seven segment display. FIG. 5 illustrates a typical seven segment display 104 including a first portion 110 capable of displaying three digits to show visibility in miles and tenths of a mile, a second portion 112, capable of displaying three digits to show the wind direction in degrees, and a third portion 114, capable of displaying two digits to indicate the wind speed in knots or in miles per hour, as desired. The wind direction can be displayed in 10° increments, if desired, so that only two digits of wind direction information need be transmitted. Likewise, the wind speed information can be displayed in one knot or one mile per hour increments. Display unit 108 is mounted in the instrument panel within the cockpit of the aircraft such as airplanes 20 and 22.

The system of the present invention can transmit the climatic condition data at a relatively low frame rate for such electronic transmission, for example a rate in the order of one frame per second. Nevertheless, the data can be transmitted at speeds enabling transmission of other information over the same radio frequency. Thus, for example at a one kilohertz bit rate, the 100 bits of digital word 58 require only 100 milliseconds, and so at a one frame per second frame rate, other digitally encoded information can be transmitted during the intervening 900 milliseconds. Preamble portion 60 of word 58 synchronizes the receiving circuitry and pre-conditions it for receipt of the climatic condition data. The station identification and climatic condition data can then be updated each second, giving the operator of the aircraft the ability to closely follow the changes in climatic conditions. The system can be battery powered, or the transmitter can be powered from conventional alternating current within terminal building 12 with a battery back-up. Aeronautical charts can be published having the identification of the transmitting station frequencies for various airports of interest to operators of aircraft. The entire system can be implemented from integrated circuits, adding minimal weight to the aircraft.

Although the present invention has been described with reference to a preferred embodiment, numerous changes and rearrangements can be made, and still the result would be within the scope of the invention.

What is claimed is:

1. A system for providing within the cockpit of an aircraft to the operator thereof a dynamic indication of climatic conditions at an airport, said system comprising:

a. a transmitting station adapted for operation at an airport and including:
      (1) a plurality of input means adapted for connection to a like plurality of climatic condition sensors for receipt therefrom of dynamic climatic condition data indicative of climatic conditions at the airport;
      (2) a like plurality of digital signal generating means connected to said plurality of input means for generating a like plurality of digital signals indicative of the climatic conditions indicated by the data;
      (3) serial converter means connected to said plurality of digital signal generating means for converting the plurality of digital signals into a serial digital signal;
      (4) encoding means connected to said serial converter means for encoding the serial digital signal to provide an encoded signal indicative of the data; and
      (5) radio transmitting means connected to said encoder means for transmitting the encoded signal on a selected frequency; and b. a receiving station adapted for operation within an aircraft and including:
      (1) radio receiving means, including frequency selection means, for receiving the encoded signal as transmitted on the selected frequency by said radio transmitting means;
      (2) decoding means for decoding the encoded signal as received by said radio receiving means to provide the dynamic climatic condition data; and
      (3) display means adapted for operation within the cockpit of an aircraft for displaying to the operator thereof a dynamic indication of the climatic conditions at the airport.

2. A system as claimed in claim 1 further comprising a like plurality of climatic condition sensors connected to said input means for providing dynamic climatic condition data thereto.

3. A system as claimed in claim 2 in which said sensors sense visibility, wind direction and wind speed and in which said display means is capable of displaying visibility, wind direction and wind speed.

4. A system as claimed in claim 1 further comprising a station address generator connected to said serial converter means for including a station address portion within the serial digital signal and a station address decoder connected to said radio receiving means for determining from the station address portion the identification of an airport transmitting the encoded signal and for enabling said radio receiving means to receive the encoded signal only for a selected address indicative of a selected airport.

5. A system as claimed in claim 1 in which said radio transmitting means comprises an F.M. transmitter and in which said radio receiving means comprises an F.M. receiver.

6. A system as claimed in claim 3 in which said sensors further sense cloud height.

7. A system as claimed in claim 3 in which said sensors further sense temperature.

8. A system as claimed in claim 3 in which said sensors further sense barometric pressure.

* * * * *